Nov. 26, 1940.    F. M. THOMAS    2,223,081
AIRSCREW BLADE MOUNTING
Filed March 31, 1938

Inventor,
F. M. Thomas,
By,
Charles L. Reynolds
Atty.

Patented Nov. 26, 1940

2,223,081

UNITED STATES PATENT OFFICE 2,223,081

AIRSCREW BLADE MOUNTING

Frederick Metcalf Thomas, Edgware, England, assignor to The De Havilland Aircraft Company Limited, Edgware, Middlesex, England Application March 31, 1938, Serial No. 199,292
In Great Britain April 6, 1937

14 Claims. (Cl. 170—162)

This invention relates to the mountings of, and the securing of, airscrew blades. Its broad object is to provide simple but sure mountings for blades for fixed, adjustable, or variable, pitch or diameter airscrews. Another object is the provision of adequate and simple means for mounting and securing a non-metallic blade such as a wooden blade to a hub or equivalent structure.

A further object is to achieve positive locking between parts comprised in an aircrew blade mounting.

A further object is to provide adequately for the transmission of the various loads between an airscrew blade and the hub or equivalent of the airscrew and also pitch changing or like mechanism which may exist in conjunction therewith.

A still further object is to ensure a high degree of accuracy in the securing of wooden or like airscrew blades through the medium of metal parts.

According to the intervention, broadly stated, a blade having a recess in its root end is secured by two main elements formed, forced or screwed into position, and locked by a third, the two main elements comprising an outer internally threaded sleeve and an inner externally threaded core, the threads being different either in pitch or hand or both and these two parts being locked together or mutually prevented from rotation, for example by a common locking plate.

Figure 1:
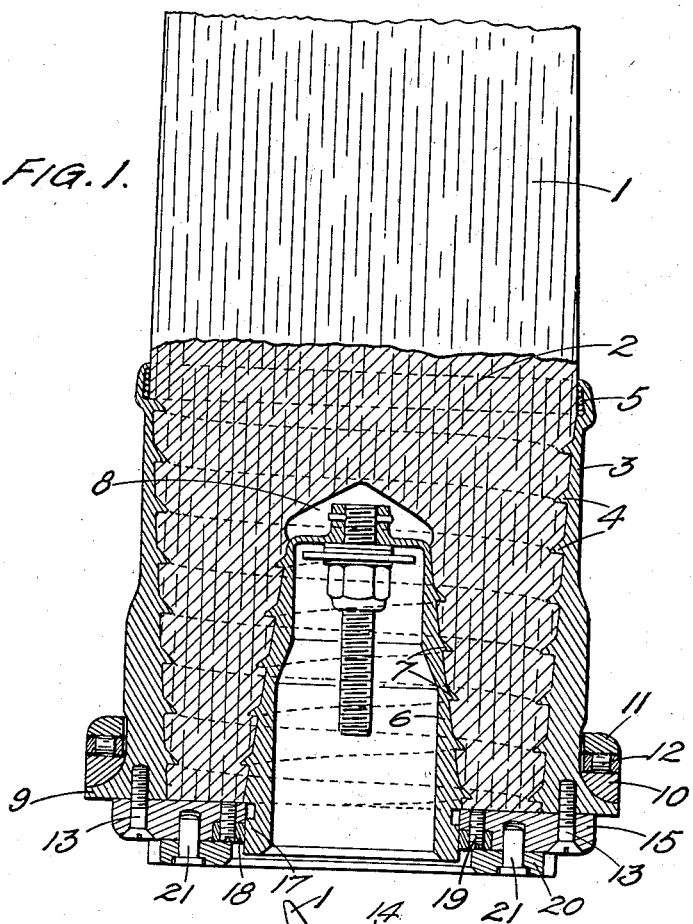
Figure 2:
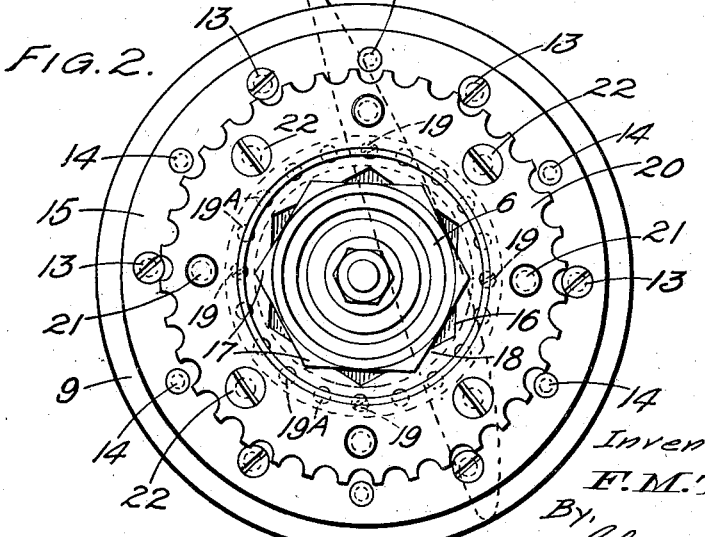

One embodiment of the invention will be described by way of example with the aid of the accompanying drawing, in which Figure 1 is a section on a diameter of the root of a blade, and Figure 2 is an end view of the root; the drawing is to be regarded as diagrammatic and illustrative. There is shown a wooden airscrew blade 1, the shank part 2 of which is substantially cylindrical in shape. An axial blind bore or socket 40 is formed in the root end of the shank 2. Upon the outside of the shank 2 is screwed a metal sleeve 3 with a buttress thread 4 formed thereon, the internal diameter of the sleeve 3 tapering somewhat so as to compress the shank 2 inwardly. The sleeve 3 is made and fitted so that when screwed home it is a tight fit upon the shank. A packing indicated at 5 may be provided within the mouth of the sleeve 4 to prevent the ingress of moisture or other deleterious matter. Into the axial socket there is screwed in like manner a hollow metal core element 6, which again has a buttress thread as at 7 and which may cut its own thread and produce the tapered formation required for it by outwardly compressing the wooden shank 2 whilst it is being screwed home, or may have the thread and/or tapered form preformed. As indicated, the core 6 is considerably tapered, and it is screwed home very tightly, the axial socket which receives it being made sufficiently large to leave a clearance space 8 within the core. The directions of the threads 4 and 7 are opposed in the present case, that is, one is right-handed and the other is left-handed. Opposed threads are preferred, but threads of considerably different pitch may have a similar effect to opposed threads when the core 6 and sleeve 3 are interlocked. Opposed threads or like threads of sufficiently different pitch to achieve mutual locking, are referred to as "different threads."

The sleeve 3 at its lower end has an outward radial abutment flange 9 against which seats the inner race 10 of a roller thrust bearing having outer race 11 and rollers 12; this is a usual form of bearing in variable pitch airscrews. Secured to the end of the sleeve 3 by symmetrically disposed screws 13 and dowels 14 (only seen in Figure 2), is an annular plate 15, and this plate 15 has a central circular hole large enough to clear a hexagon head 17 formed on the outer end of the core 6. Rebated into the outer face of the plate 15 is a locking collar 18 secured by four screws 19. The inner edge of this collar is formed as a double hexagon as shown at 16, so that there are twelve positions which it can occupy in regard to the head 17 with which it engages. A large number of holes as at 19A (say twenty holes) are provided for alternative positions of the screws 19, and a different number of holes (say sixteen) is provided in the collar 18. In the example, by virtue of the vernier adjustment provided by the different spacing of the holes and the fact that the collar can be fitted over the hexagon in two ways spaced by 30°, it will be possible always to find four registering and symmetrically spaced pairs of holes for the screws 19, in positions at the most three-quarters of a degree apart.

Secured to the outer face of the plate 15 is an index plate 20 having as in known airscrews, a serrated edge for the engagement of a counterweight bracket which also serves as the lever by which the blade is rotated about its longitudinal axis, i. e. by which the pitch is changed. The index plate 20 is secured to the plate 15 by dowels 21 and screws 22. The assembled root or shank of the blade so constituted therefore presents the same external attributes as in the case of known wholly metal blade airscrews, in that it has the thrust bearing and the index plate as is required; at the same time it affords means whereby a wooden blade can be adequately and accurately secured. It will be observed that the core 6 and sleeve 3 are rigidly interlocked in the rotational sense through the medium of the plate 15 and locking collar 18. Thus in view of the different threads, especially the opposite thread arrangement preferred, it is immaterial whether one is dealing with a right or a left-handed blade, since the locking of the blade against rotation or self-tightening which might be occasioned by the centrifugal twisting moment of the blade, is rendered ineffective.

What I claim is:

1. Mounting for an airscrew blade comprising in combination a metal internally threaded and internally tapered sleeve engaged around the blade shank, an externally threaded and externally tapered core element engaged within an axial bore of the shank so as to produce outward compression in said shank, the threads of the sleeve being different from those of the core, and means for interlocking said sleeve and said element against relative rotation.

2. Mounting for an airscrew blade comprising in combination a metal internally tapered sleeve with a buttress thread formed therein to engage the blade shank, an externally tapered core element with a buttress thread thereon to engage within an axial bore of the blade shank, the threads being of opposite hands, and means for interlocking said sleeve and said element against relative rotation.

3. Mounting for an airscrew blade comprising in combination an external sleeve screwed on to the blade shank, an internal core element screwed into the shank axially and threaded of opposite handed screwing as compared to the sleeve, and means for interlocking said sleeve and said element against relative rotation, such means including means for affording vernier adjustment.

4. Mounting for an airscrew blade comprising in combination an external sleeve screwed on to the blade shank, an internal core element screwed into the shank axially oppositely to the screwing of the sleeve and a plate disposed across the root end of the shank interconnecting the sleeve and element against relative rotation.

5. Mounting for a non-metallic airscrew blade of a variable pitch airscrew, comprising in combination a metal internally threaded sleeve engaged around the blade shank, an externally threaded core element engaged within an axial bore of the shank, the threads being different, and means for interlocking said sleeve and said element against relative rotation, said means also forming an operative connection on the blade for pitch-changing means.

6. An airscrew blade having a non-metallic shank of cylindrical form, a metal sleeve mounted tightly thereon compressing said shank inwards, a first screw thread formed within said sleeve to engage said shank, a core element fitted tightly within an axial blind bore from the root end of said shank, a second screw thread formed on said element to engage said bore said second thread being of opposite hand to said first thread, a nut-like head formed on said core element, a centrally-opened plate secured to said sleeve, and locking collar attachable to said plate in selected positions and adapted to engage said head to prevent relative rotation thereof.

7. A mounting for an airscrew blade, comprising a sleeve having internal threads which have a given characteristic, such as pitch or helical direction, said sleeve closely embracing the blade's shank, with its threads received in complemental helical grooves in the outer surface thereof, such thread characteristic being so chosen as to require relative disengaging movement of the sleeve and shank in a single, characteristic helical path, the shank having a bore in its inner end, disposed substantially axially of the sleeve and shank, when thus interengaged, a core having external threads, the characteristic of which, corresponding to the chosen characteristic of the sleeve's threads, is different in degree from such sleeve-thread characteristic, said core being closely received within the shank's axial bore, with its threads received in complemental helical grooves in the walls thereof, such core-thread characteristic being so chosen as to require relative disengaging movement of the core and shank in a single helical path which is non-coincident with and antagonistic to the path of movement required by the sleeve's threads, and means interengaged between the core and the sleeve, while they are each so engaged with the shank, to lock them positively against relative movement, whereby, by reason of the mutually antagonistic paths of movement required for unscrewing of the shank from each of the core and sleeve, the latter, by their interlocking engagement with each other, are mutually locked upon the shank.

8. An airscrew blade mounting as in claim 7, characterized in that the locking means are disengageable only by movement of parts inwardly, in a direction opposite to the direction in which they tend to move by centrifugal force.

9. An airscrew blade mounting as in claim 7, characterized in that the shank is of wood or like compressible material, and in that the sleeve and the core, at their outer end, farther from the axis of the propeller's rotation, are spaced farther apart than at their inner end, closer to the axis of the propeller's rotation, thereby to squeeze the shank progressively towards its root end.

10. An airscrew blade mounting as in claim 7, characterized in that the shank is of wood or like compressible material, and in that the sleeve interior tapers from a lesser diameter at its inner end to a greater diameter at its outer end, to compress the shank upon the core progressively towards its inner root end.

11. An airscrew blade mounting as in claim 7, characterized in that the shank is of wood or like compressible material, and in that the core exterior tapers from a greater diameter at its inner end to a lesser diameter at its outer end, to expand the shank towards the sleeve progressively towards its inner root end.

12. An airscrew blade mounting as in claim 7, characterized in that the shank is of wood or like compressible material, and in that the sleeve interior tapers from a lesser diameter at its inner end to a greater diameter at its outer end, and in that the core exterior tapers from a greater diameter at its inner end to a lesser diameter at its outer end, to squeeze the shank between the sleeve and core progressively towards its inner root end.

13. A mounting for an airscrew blade the shank end whereof is of wood or like material, comprising a sleeve having internal threads of a pitch P1, said sleeve closely embracing the blade's shank, and the threads biting into the outer surface thereof, the shank having a bore in its inner end, disposed axially of the sleeve and shank, when thus interengaged, a core having external threads of a pitch P2, different from the pitch P1 of the sleeve's threads, said core being closely received within the shank's axial bore, with its threads biting into the walls thereof, and means interengageable between the core and sleeve, while so engaged, to lock them positively against relative movement.

14. A mounting for an airscrew blade comprising, in combination with the blade shank, two separate elements each having threaded engagement with the shank, the thread of one such element having a characteristic, such as pitch or helical direction, which requires its disengagement from the shank by their relative movement along a single, characteristic helical path, the thread of the other such element having a corresponding characteristic so chosen as to require its disengagement from the shank by their relative movement along a single, characteristic helical path which is different from and which has an axial component with respect to the first-mentioned helical path, and means interengaged between the two elements, to lock them positively against relative movement.

FREDERICK METCALF THOMAS.